United States Patent [19]

Stedman

[11] 4,084,715

[45] Apr. 18, 1978

[54] LIFT TRUCK WITH MEANS TO PIVOT MAST AND THE FORK CARRIAGE THEREON

[75] Inventor: Robert N. Stedman, Chillicothe, Ill.

[73] Assignee: Caterpillar Tractor Co., Peoria, Ill.

[21] Appl. No.: 660,743

[22] Filed: Feb. 23, 1976

[51] Int. Cl.[2] .......................... B65G 47/00; B66B 9/20

[52] U.S. Cl. .................................... 214/660; 187/9 E; 214/DIG. 10; 214/701 B; 214/672; 214/674

[58] Field of Search ........................ 214/660, 670–674, 214/DIG. 10, 700, 701 R, 701 P, 770, 773, 766, 138 R; 187/9 R, 9 E

[56] References Cited

U.S. PATENT DOCUMENTS

| | | | |
|---|---|---|---|
| 3,070,244 | 12/1962 | Lull | 214/770 |
| 3,251,490 | 5/1966 | Guinot | 214/138 R |
| 3,586,192 | 6/1971 | Goodacre | 214/701 P |
| 3,726,427 | 4/1973 | Carlund | 214/701 P |
| 3,727,781 | 4/1973 | Ramsey | 214/701 P |
| 3,826,392 | 7/1974 | Farley | 214/672 |

FOREIGN PATENT DOCUMENTS

| | | | |
|---|---|---|---|
| 1,145,097 | 3/1963 | Germany | 214/700 |
| 6,611,507 | 2/1968 | Netherlands | 214/146.5 |
| 821,383 | 10/1959 | United Kingdom | 214/672 |

*Primary Examiner*—Drayton E. Hoffman
*Assistant Examiner*—R. B. Johnson
*Attorney, Agent, or Firm*—John W. Grant

[57] ABSTRACT

A fork carriage attitude adjusting arrangement includes a mounting tower secured to and extending upwardly from the forward end of a longitudinally extending frame. A lever arrangement is pivotally attached to the mounting tower and has a hydraulic tilt motor operatively connected thereto for adjusting its angularity relative to the mounting tower. A pair of vertically spaced parallel arms have their rearwardly extending ends pivotally connected to the lever arrangement and their forwardly extending ends pivotally connected to a mast assembly to maintain the mast assembly at a predetermined attitude relative to the lever arrangement. The mast assembly includes at least one upright, a fork carriage and a roller mounting device for rotatably attaching a plurality of rollers to the fork carriage for adjusting the angularity of the fork carriage relative to the upright so that the angularity of the fork carriage may be selectively adjusted to maintain it at a predetermined attitude when the relative angularity between the mast assembly and mounting tower is changed by pivotal movement of the lever arrangement.

1 Claim, 10 Drawing Figures

LIFT TRUCK WITH MEANS TO PIVOT MAST AND THE FORK CARRIAGE THEREON

BACKGROUND OF THE INVENTION

This invention relates to a fork lift truck having a mast assembly supported by a parallelogram linkage and more particularly to the mechanism for adjusting the tilt angle of the fork carriage.

A fork lift truck typically has a stationary upright secured to the forward end of the vehicle, one or more inner uprights slidably disposed in telescopic fashion relative to the stationary upright and a fork carriage mounted for vertical movement relative to the innermost upright. A vertically arranged hydraulic jack is normally centrally located within the innermost upright and cooperates with a chain reeving arrangement for raising and lowering the inner uprights and the fork carriage either sequentially or simultaneously, or a combination of both. One of the problems associated with such a lift truck is that the vertical uprights, hydraulic jack and chain reeving greatly obstruct the forward visibility of the operator. This contributes to operator fatigue since he is constantly looking through the mast assembly and is continually leaning to one side or the other in an effort to see around the components of the mast assembly to watch where he is going. Another problem encountered is that to provide maximum lift height with a minimum number of uprights, the uprights are relatively tall and the vertical height prevents passage of the fork lift truck through many doorways. A desirable feature commonly provided on fork lift trucks is that of being able to tilt the mast assembly or fork carriage rearwardly to elevate the forward tips of the fork for improved load retention when maneuvering the lift truck.

OBJECTS OF THE INVENTION

Accordingly, an object of this invention is to provide an improved fork lift truck which provides improved operator visibility toward the front.

Another object of this invention is to provide such an improved fork lift truck which reduces the overall height of the mast assembly without sacrifice to the maximum lift height capability.

Another object of this invention is to provide an improved fork lift truck of the character described which eliminates the placement of the lift jack centrally within the mast assembly directly in line with the operator's forward visibility.

Another object of this invention is to provide an improved fork lift truck which has the capability of tilting the mast assembly rearwardly for better retention of the load.

Another object of this invention is to provide an improved fork lift truck in which the angle of the mast assembly is set so that a portion of the load center loss caused by the forward swing of the lift arms is cancelled by the rearward travel of the fork carriage as it is elevated.

Another object of this invention is to provide an improved fork lift truck in which the angle of the forks may be adjusted independently of the tilting of the mast assembly to permit the angle of the forks to be set relative to a predetermined reference plane when the mast assembly is employed exclusively in a rearwardly tilted condition.

Other objects and advantages of the present invention will become more readily apparent upon reference to the accompanying drawings and following description.

DESCRIPTION OF THE PREFERRED EMBODIMENT

Figure 1:
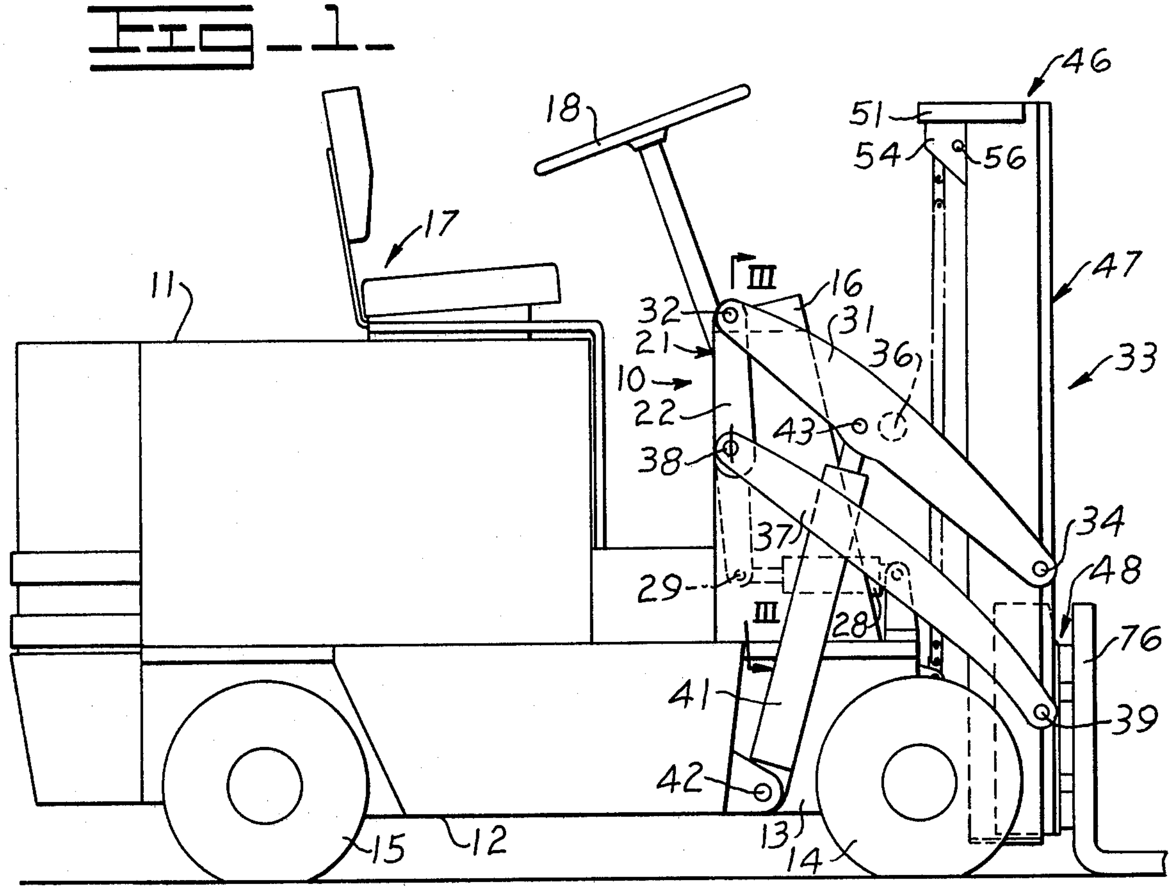
FIG. 1 is a side elevational view of a fork lift truck on which the fork carriage attitude adjusting arrangement embodying the principles of the present invention is incorporated.
Figure 2:
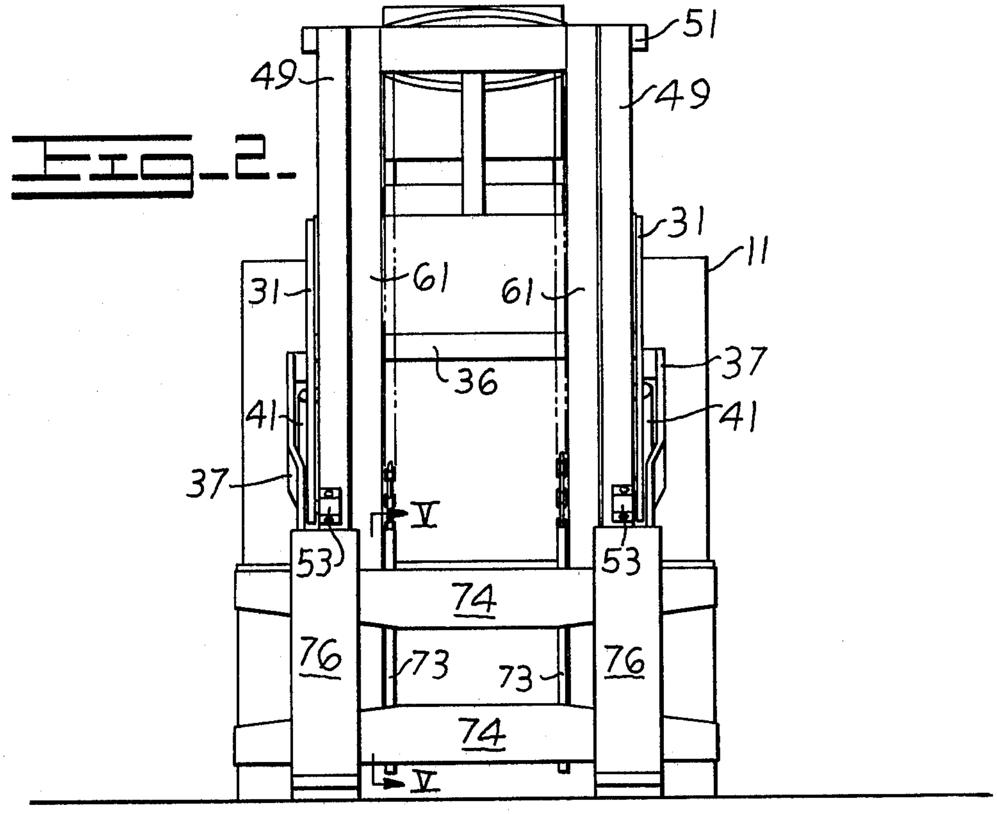
FIG. 2 is a front elevational view of the fork lift truck of FIG. 1.

Referring now to the drawings, a mast tilting arrangement is generally indicated by the reference numeral 10 in association with a fork lift truck 11 which has a body 12 mounted on a longitudinally extending frame 13. The frame is supported by a pair of front drive wheels 14 and a pair of rear steerable wheels, one of which is shown at 15, in the usual manner. The frame has a mounting tower 16 extending upwardly from the forward end thereof and rearwardly of the center line of the front wheels. A seat 17 and a steering wheel 18 are suitably attached to the body and are disposed rearwardly of the mounting tower.

A pair of lever arrangements, one shown at 21, are disposed at opposite sides of the mounting tower 16 with each lever arrangement including a first lever 22 secured to and extending upwardly from a tubular pivot shaft 23. The shaft pivotally extends through a bore 24 formed in a wall 26 of the mounting tower and has a second lever 27 secured to and extending downwardly from its inner end. A horizontally disposed hydraulic tilt jack 28 has its head end secured to the forward end of the frame 13 and its rod end pivotally attached to the lower end of the second lever by a pin 29.

A pair of laterally spaced elongated lift arms 31 have their rearward ends disposed at opposite sides of the mounting tower 16 and secured to the upper ends of the first levers 22 by a pair of pivot pins, one shown at 32. The forwardly extending distal ends of the lift arms are pivotally connected to a mast assembly 33 disposed forwardly of the frame 13 by a pair of pivot pins, one shown at 34. A cross tube 36 extends between and has its ends secured to the inner sides of the lift arms intermediate their ends for rigidly interconnecting the lift arms. A pair of elongated laterally spaced guide arms 37 are spaced below and operationally parallel to the lift arms and have their rearward ends pivotally attached to the first lever by a pair of pivot pins, one shown at 38, extending into and secured to the respective tubular shaft 23. Each of the pivot pins is disposed directly below the respective pivot pin 32. The forwardly extending distal ends of the guide arms are pivotally attached to the mast assembly by a pair of pivot pins, one shown at 39, which are disposed vertically below the pivot pins 34.

The linear distance between the pivot pins 32 and 34 is equal to the linear distance between the pivot pins 38 and 39 while the linear distance between pins 32 and 38 is equal to the linear distance between pins 34 and 39. Thus, the lift arms 31, the guide arms 37, the first levers 22, and the portion of the mast assembly 33 between the pins 34 and 39 cooperate to form a four-bar parallelogram-type linkage for maintaining the mast assembly in a predetermined angular relationship relative to the first lever during raising and lowering of the mast assembly. A pair of hydraulic jacks 41 are disposed on opposite sides of the mounting tower and have their head ends pivotally attached at pivots 42 to the frame rearwardly of the front wheels. The rod of each jack is pivotally attached to a respective lift arm by a pivot pin 43.

The mast assembly 33 is parallel to the first lever 22 and includes an outer upwardly extending upright 46, an inner upright 47 mounted within the outer upright for telescopic movement therebetween, and a fork carriage 48 mounted within the inner upright for vertical movement therebetween. The outer upright includes a pair of laterally spaced, upwardly extending parallel outer channel members 49 which have their lower ends tucked in between the front wheels 14 when the mast assembly is in its lowered position as shown in FIG. 1. As more clearly shown in FIG. 8, the channel members open toward each other and have their upper ends rigidly tied together by gussets 54 are individually secured to the rearward edges of the channel members and the lower surface of the tie bar 51. A pin 56 is carried by each of the gussets with each pin rotatably supporting a chain roller 57. A pair of upper guide rollers 58 are rotatably disposed on a pair of pins 59 which are individually secured to the inner upper ends of the outer channel members.

The inner upright 47 has a pair of parallel laterally spaced vertically disposed inner channel members 61 which open inwardly toward each other and have a J-shaped cross section. Each inner channel member has an outwardly extending flange 62 protruding into the respective outer channel member 49 and rearwardly of the respective upper guide roller 58. The upper ends of the inner channel members are interconnected by a vertically disposed plate 63 while the lower ends are interconnected by a horizontally disposed plate 64. A pair of lower guide rollers 66 are rollably disposed within the outer channel members and are rotatably supported on a pair of pins 67, each of which is secured to the lower outer end of the inner channel members. A pair of laterally spaced lugs 68 are secured to the rear side of the upper plate with each lug carrying a chain roller 69 rotatably mounted on a pin 71 secured to the lug.

The fork carriage 48 includes a frame 72 having a pair of spaced vertically extending plates 73 interconnected at their upper and lower ends by a pair of cross bars 74 to which a pair of forks 76 are attached in the usual manner. A portion of the vertical plates project rearwardly between the inner channel members 61 with each plate having a pair of vertically spaced bores 81 extending therethrough. A pivot pin 82 is secured in the lower bore and extends outwardly toward the inner channel member. Similarly, an annular portion 83 of an eccentric pin 84 is rotatably positioned within the upper bore to permit selected rotational adjustment thereof while a reduced diameter portion 86 formed on one end of the eccentric end extends outwardly toward the inner channel member. A flange 87 is formed on the opposite end with the flange being removably secured to the vertical plate by a plurality of bolts 88.

A pair of elongated bogie mountings 89 and 91 are disposed between each of the vertical plates 73 and the respective inner channel member 53. The bogie mountings are parallel to the vertical plates and each mounting has three vertically spaced bores 92, 93, and 94 extending therethrough. The pivot pin 82 extend through the center bore 93 formed in the first bogie mounting 89, while the reduced diameter portion 86 of the eccentric pin 84 extends into the center bore 93 of the second bogie mounting 91. A pair of pins 96 individually extend into the bores 92 and 94 of each of the bogie mountings with each pin rotatably carrying a guide roller 97. The guide rollers are rollably arranged within the respective inner channel member.

Figure 4:
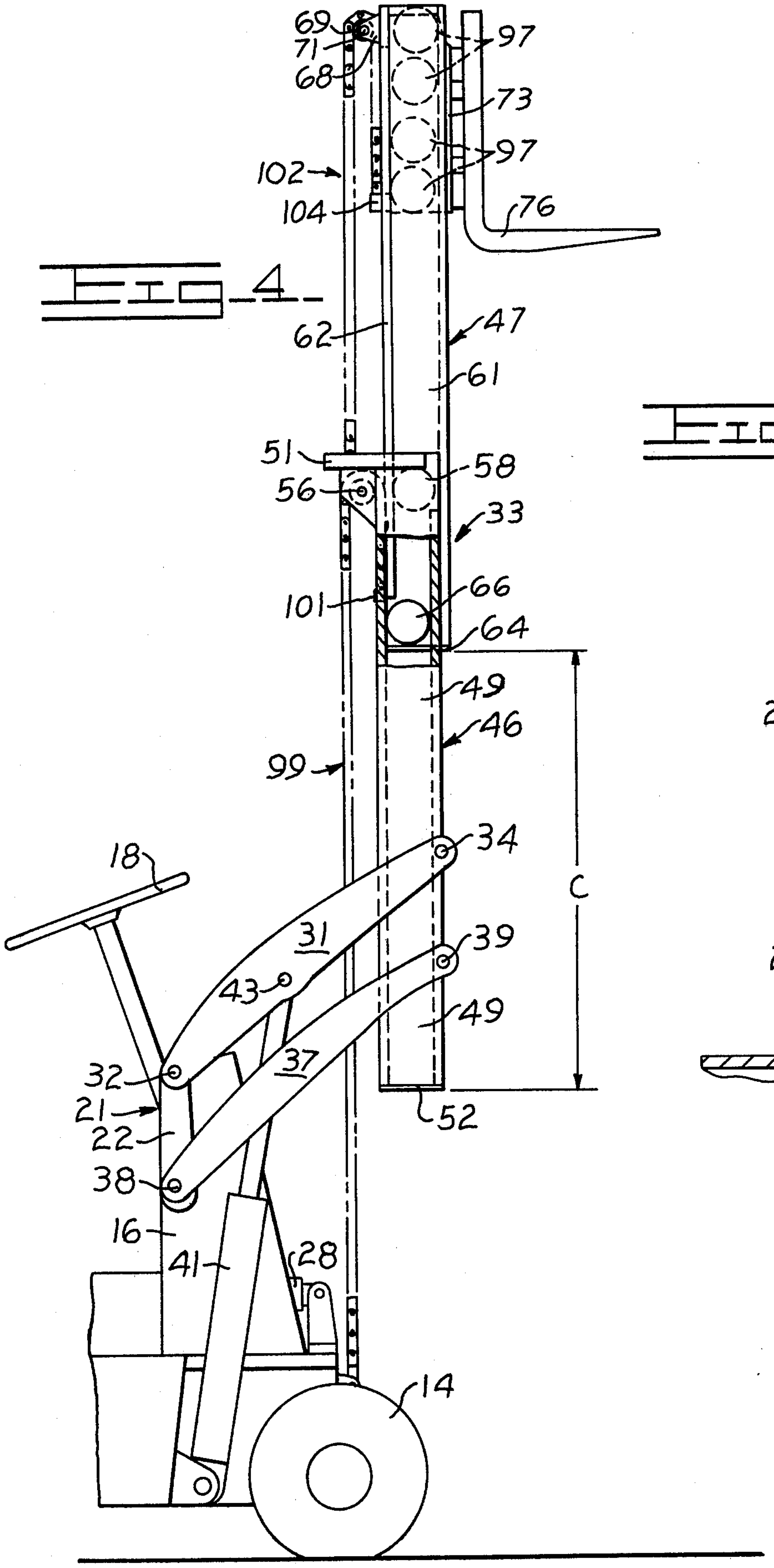
FIG. 4 is a side elevational view of the fork lift truck of FIG. 1 with the fork carriage raised to its highest elevated position.
Figure 3:
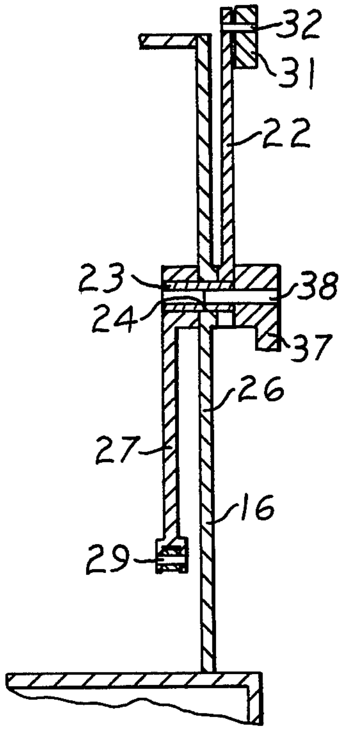
FIG. 3 is a vertical sectional view taken along line III—III of FIG. 1.
Figure 5:
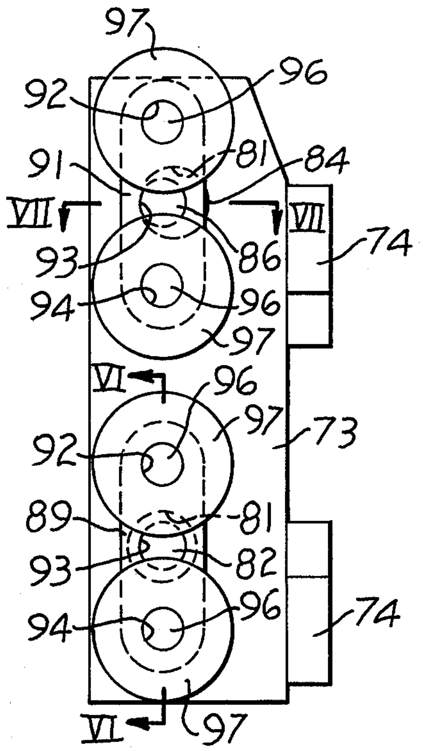
FIG. 5 is a vertical sectional view taken along line V—V of FIG. 2 to more clearly illustrate the fork carriage attitude adjusting arrangement.
Figure 6:
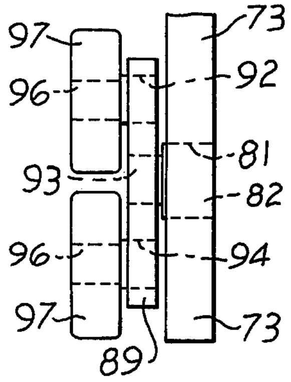
FIG. 6 is a vertical sectional view taken along line VI—VI of FIG. 5.
Figure 7:
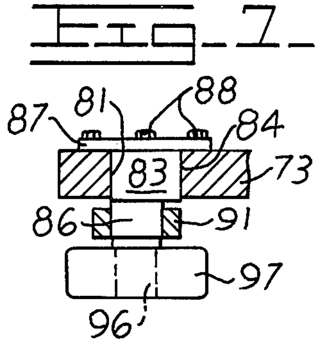
FIG. 7 is a horizontal sectional view taken along line VII—VII of FIG. 5.
Figure 8:
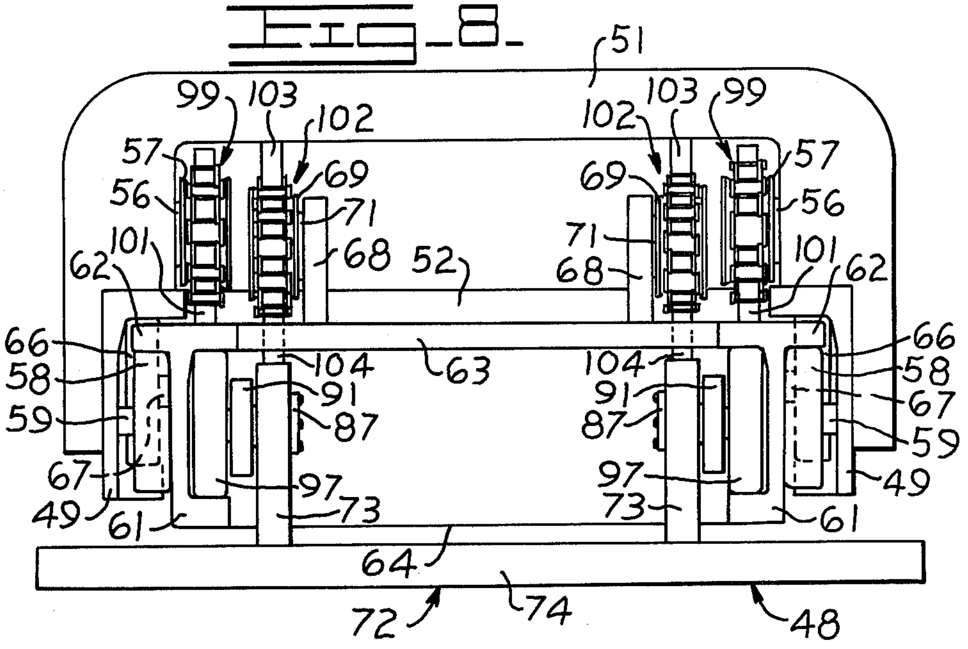
FIG. 8 is a top view of the mast assembly.

As more clearly shown in FIGS. 4 and 8, a first pair of elongated flexible chains 99 are looped over the chain rollers 57 at the upper end of the outer channel members 49 and have one of their ends anchored to the forward end of the frame 13. The other ends are attached to a pair of lugs 101 which are secured to the lower rearward ends of the inner channel members 61. Similarly, a second pair of elongated flexible chains 102 are looped over the chain rollers 69 and have one of their ends anchored to the tie bar 51 through a pair of lugs 103 secured thereto while their other ends are attached to a pair of lugs 104 secured to the rear edges of the vertical plates 73 of the fork carriage 48.

OPERATION

While the operation of the present invention is believed clearly apparent from the foregoing description, further amplification will subsequently be made in the following brief summary of such operation. With the hydraulic lift jacks 41 in a retracted position and thus the mast assembly 33 in its lowered position as shown in FIG. 1, the lift arms 31 and guide arms 37 are angled downwardly and forwardly so that the pivot pins 34 and 39 are elevationally lower than the pivot pins 32 and 38. Extending the lift jacks causes the arms to pivot about the pivot pins 32 and 38 and directly raise the outer channel members 49 of the outer upright 46. In so doing, the first flexible chains 99 being anchored to the frame 13 pull the inner channel members 61 of the inner upright 47 upwardly relative to the outer channel members a distance equal to the movement of the outer channel members. The guide rollers 58 and 66 cooperate to guide the movement of the inner upright. Likewise, the upward movement of the inner channel members causes the second flexible chains 102 to pull the fork carriage 48 upwardly relative to the inner upright a distance equal to the movement of the inner upright with the movement guided by the guide rollers 97. Thus, a triple mast effect is achieved with only a double mast section. Retracting the lift jacks from their extended condition reverses the above operation and the fork carriage, inner upright, and outer upright are returned to their lower position.

Figure 9:
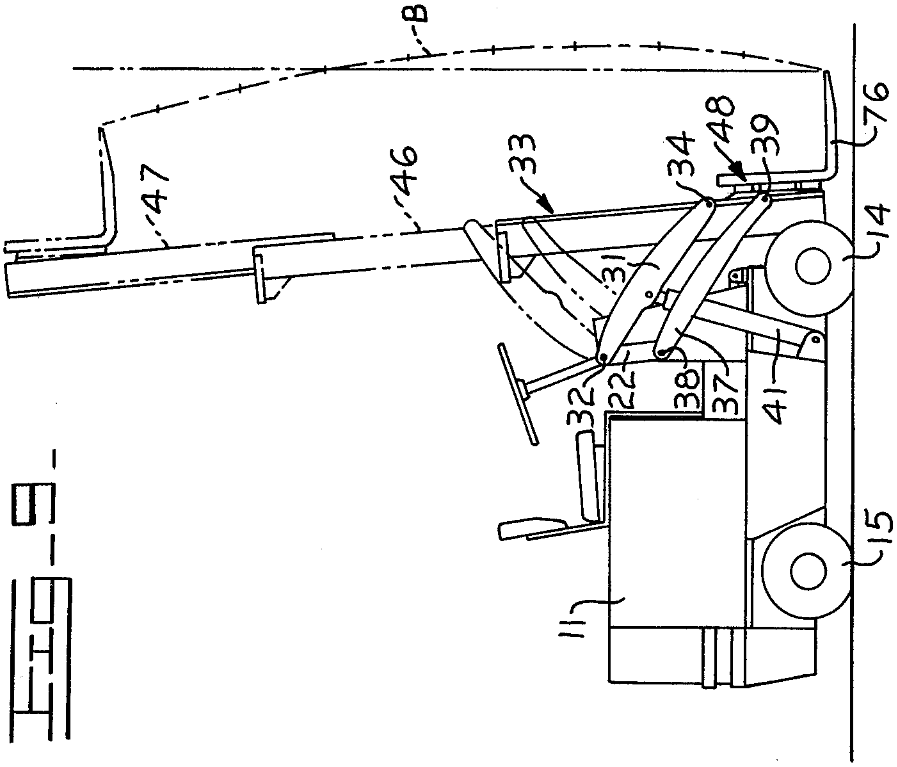
FIG. 9 is a reduced sized schematic view of the fork lift truck of FIG. 1 with the mast assembly shown in its lower rearwardly tilted position by solid lines and in its elevated rearwardly tilted position by dashed lines.

Tilting the mast assembly 33 relative to the mounting tower 16 from the vertical position shown in FIGS. 1 and 4 to the rearwardly tilted position shown in FIG. 9 is accomplished by retraction of the hydraulic tilt jack 28. This pivots the second levers 27, the tubular shafts 23, and the first levers 22 about the axis of the tubular shafts so that the upper ends of the first levers and thus the pivot pins 32 are pivoted rearwardly relative to the mounting tower. This changes the relative angularity between the first levers and the mounting tower. Since the lift arms 31, guide arms 37, first levers 22, and the mast assembly form a parallelogram linkage, the upper end of the mast assembly is tilted rearwardly about the pivot pins 39 in unison with the first levers and remains at a predetermined attitude relative thereto. The mast assembly is tilted independently of the raising or lowering operations and may be tilted at any position of the lift arms.

Alternatively, the pins 34 and 39 pivotally attaching the mast assembly 33 to the arms 31 and 37 may be secured to the outer channel members 49 at locations to provide a 6° rearward tilt to the mast assembly when the levers 22 are in a true vertical condition.

Figure 10:
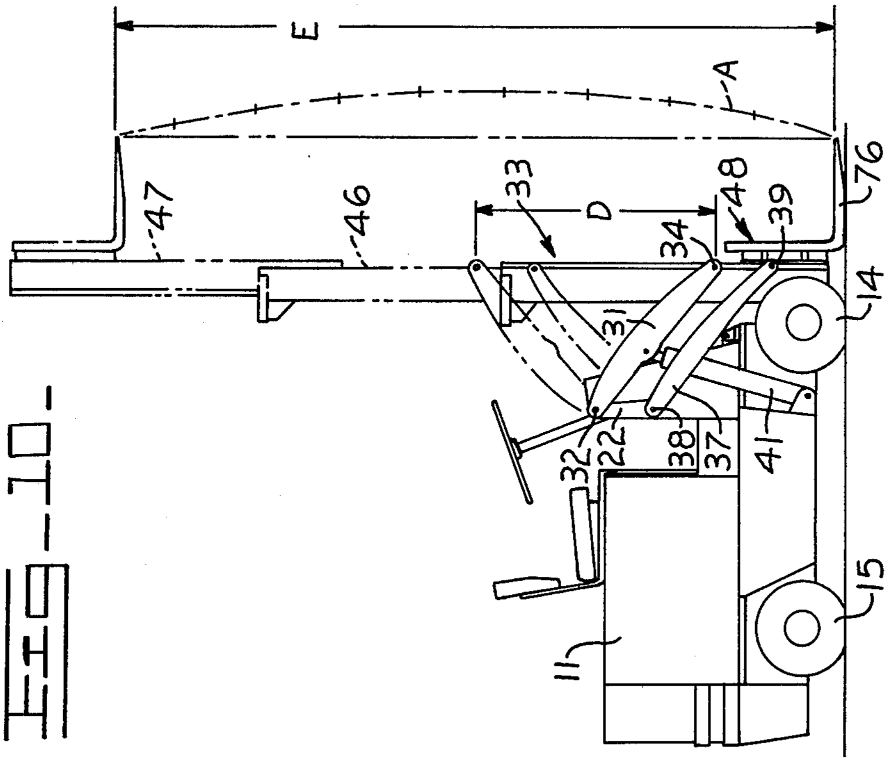
FIG. 10 is a reduced sized schematic view similar to FIG. 9 with the mast assembly shown in its lowered vertical position by solid lines and in its elevated vertical position by dashed lines.

With the mast assembly 33 in a true vertical condition as shown in FIGS. 1 and 10, the tips of the forks follow a path indicated by the broken line A when it is raised from its lower position to its fully raised position. The broken line readily show that the fork carriage 58 moves forwardly slightly as the lift arms 31 and guide arms 37 pivot in an arc about the pivot pins 32 and 38. Such forward movement of the fork carriage is not detrimental to the stability of the lift truck when the lift truck is handling light loads. However, when the lift rearwardly is handling heavy loads, forward movement of the fork carriage upsets the balance of the truck and is thereby objectionable. To minimize the forward movement, the mast assembly is tilted rearwardly from the vertical condition up to an angle of 6° as illustrated in FIG. 9. The path that the tip of the forks follow when the mast assembly is tilted rearwardly 6° is indicated by the broken line B. A reduction in the forward movement of the fork carriage is achieved since the fork carriage and inner upright are moving upwardly and rearwardly at the 6° angle at a faster rate than the mast assembly is being raised. Ideally a slight upward tipping of the forks to an angle of 1° or 2° is desirable to aid in retention of the loads on the forks. However, the 6° tipping caused by the rearward tilting of the mast assembly 33 is undesirable. To compensate for such rearward tilting when the mast assembly is maintained exclusively in the rearward tilted position, the eccentric pins 84 are manually rotated in their bores by unbolting the flanges 87 and rotating the flanges with the use of a suitable tool. Since the guide rollers are restrained in the inner channel members 61, this causes the vertical plates to pivot about the lower pivot pin 82, resulting in tipping of the upper ends of the vertical plates relative to the inner channel members to establish the attitude of the fork carriage at a predetermined angle relative to the mounting tower. In the present invention the eccentric pins are effective to tilt the fork carriage up to 4° relative to the inner upright so that a 2° tip angle of the forks may be obtained when the mast assembly is tilted 6° rearwardly.

The effective length of a particular upright is the maximum distance that it travels and is always something less than its actual length due to the span required between the guide rollers to maintain stability. In the present case, the effective length of the outer upright is indicated by the dimension C as shown in FIG. 4. As shown in FIG. 10, the vertical distance that the pins 34 travel from their lowermost position to their uppermost position as the lift arms 31 are pivoted about the pins 32 is indicated by the dimension D which in the present case is equal to the dimension B. Thus, due to the combined movement of the outer upright and the inner upright, the inner upright travels a distance equal to twice the effective length of the outer upright. The fork carriage also moves upwardly relative to the inner upright a distance equal to the effective length C and the total movement of the fork carriage is indicated by the dimension E. Since a triple mast effect is achieved with the present invention, the dimension E is equal to three times the dimension C.

The rearward location of the pivot pins 32 and 38 connecting the lift arms 31 and the guide arms 37, respectively, to the mounting tower 16 and locating the pivot pins 34 and 39 at the forward edges of the outer channel members 49 both contribute to the maximumization of the length of the arms. This minimizes the forward displacement of the mast assembly caused by the pivot pins 34 and 39 swinging in an arc about the pins 32 and 38, respectively, as the mast assembly is raised. Moreover, the elevational or true vertical distance between pins 32 and 34 is one-half the dimension B so that movement of the pin 34 is equally divided below and above the pin 34.

In view of the foregoing, it is readily apparent that the structure of the present invention provides an improved fork lift truck mounted in a manner to permit it to be tilted rearwardly for better retention of the load on the forks. This is accomplished by mounting the mast assembly to the forward ends of a parallelogram-type linkage which has its rearward ends pivotally attached to a lever such that pivoting the lever results in simultaneously tilting of the mast assembly. With this mounting arrangement, the inner upright and the fork carriage of the mast assembly are raised and lowered by a chain reeving in direct response to raising and lowering of the parallelogram-type linkage, and thus the mast assembly, thereby eliminating the placement of a hydraulic lift jack and its attendant lift chains in the center of the mast assembly and greatly improves the forward visibility. Also, with this mounting arrangement, the outer upright is raised by the parallelogram-type linkage a distance equal to the effective length thereof thereby providing a triple mast lift effect with only a double upright arrangement. Thus, the overall height of the mast assembly is lowered while maintaining a maximum lift height equal to a standard double mast fork lift truck. The reduced height of the mast assembly allows the operator to see over the mast rather than through it during a majority of vehicular operations. The eccentric pin mounting of the upper guide rollers of the fork carriage permits the angle of the forks to be adjusted independently of the tilting of the mast assembly particularly when the mast assembly is tilted rearwardly for extended periods of operation.

While the invention has been described and shown with particular reference to the preferred embodiment, it will be apparent that variations might be possible that would fall within the scope of the present invention, which is not intended to be limited except as defined in the following claims.

What is claimed is:

1. A fork carriage attitude adjusting arrangement for a lift truck having a longitudinally extending frame, comprising;

a mounting tower secured to and extending upwardly from the forward end of the frame;

lever means pivotally attached to the mounting tower;

a hydraulic tilt motor operatively connected to the lever means for adjusting the angularity of the lever means relative to the mounting tower;

a pair of vertically spaced parallel arms having forward and rearwardly disposed ends with the rearward ends pivotally connected to the lever means;

a hydraulic motor mounted to the frame and pivotally connected to one of the arms for pivoting the arms between a lowered and a raised position; and a mast assembly pivotally connected to the forward ends of the parallel arms in a manner sufficient to maintain the mast assembly at a predetermined attitude relative to the lever means, said mast assembly including at least one upright, a fork carriage, a plurality of rollers rollably associated with the upright, and roller mounting means for rotatably attaching the rollers to the fork carriage to permit guided vertical movement of the fork carriage relative to the upright and which is selectively adjustable for adjusting the angularity of the fork carriage relative to the uprights; and wherein said roller mounting means includes a pair of bogie mountings disposed at opposite sides of the fork carriage with each bogie mounting having two of the rollers rotatably mounted thereto and means forming a bore intermediate the rollers, and a pair of eccentric pins selectively adjustably rotatably connected to the fork carriage at opposite sides thereof with each eccentric pin having an annular axially offset portion extending into the bore of the respective bogie mounting.

* * * * *